(12) United States Patent
Chen et al.

(10) Patent No.: US 11,435,186 B2
(45) Date of Patent: Sep. 6, 2022

(54) DEAD RECKONING METHOD AND APPARATUS FOR VEHICLE, DEVICE AND STORAGE MEDIUM

(71) Applicant: Beijing Baidu Netcom Science and Technology Co., LTD, Beijing (CN)

(72) Inventors: Wenlong Chen, Beijing (CN); Yang Yang, Beijing (CN); Pengbin Yang, Beijing (CN); Jianxu Zhang, Beijing (CN)

(73) Assignee: Beijing Baidu Netcom Science and Technology Co., LTD, Beijing (CN)

( * ) Notice: Subject to any disclaimer, the term of this patent is extended or adjusted under 35 U.S.C. 154(b) by 0 days.

(21) Appl. No.: 17/350,744

(22) Filed: Jun. 17, 2021

(65) Prior Publication Data
US 2021/0310809 A1    Oct. 7, 2021

(30) Foreign Application Priority Data
Jul. 20, 2020    (CN) .......................... 202010700376.9

(51) Int. Cl.
*B60W 40/10*    (2012.01)
*B60W 50/00*    (2006.01)
(Continued)

(52) U.S. Cl.
CPC ............ *G01C 21/165* (2013.01); *G01S 19/49* (2013.01)

(58) Field of Classification Search
CPC ...... B60W 2050/0028; B60W 2556/50; G01C 21/165; G08G 1/096894; G08G 1/20; G05B 19/416; G05B 2219/43006; G05D 1/0274; G05D 1/027; G05D 1/0272; G01S 7/022; G01S 19/41; G01S 13/60;
(Continued)

(56) References Cited

U.S. PATENT DOCUMENTS 9,288,632 B2*    3/2016    Yang ..................... G01S 5/0257
2012/0116712 A1*    5/2012    Hollenstein .......... G01C 22/025
702/150
(Continued)

FOREIGN PATENT DOCUMENTS

CN    108871336 A    11/2018
CN    109405837 A    3/2019
(Continued)

OTHER PUBLICATIONS

Nov. 5, 2021—(EP) EESR—App. No. 21164666.6.
(Continued)

*Primary Examiner* — Abby Y Lin
*Assistant Examiner* — Hossam M Abd El Latif
(74) *Attorney, Agent, or Firm* — Banner & Witcoff, Ltd.

(57) ABSTRACT

The present application discloses a dead reckoning method for a vehicle, an apparatus, an apparatus and a storage medium, and relates to the fields of vehicle control, intelligent driving and automatic driving. The specific implementation solution is as follows: obtaining a position and attitude increment of the vehicle on the basis of wheel speed information of the vehicle; and carrying out dead reckoning on the position and attitude of the vehicle at a current moment, on the basis of the position and attitude increment of the vehicle and the position and attitude at a previous moment.

20 Claims, 9 Drawing Sheets

(51) Int. Cl.
  *G01C 21/16* (2006.01)
  *G01C 21/28* (2006.01)
  *G01S 19/49* (2010.01)

(58) Field of Classification Search
  CPC .. G01S 2013/932; G01S 5/021; G01S 5/0242; G01S 5/0263; G01S 5/04; G01S 19/49; H04W 64/006
  USPC .......................................................... 701/498
  See application file for complete search history.

(56) References Cited

U.S. PATENT DOCUMENTS

| | | | | |
|---|---|---|---|---|
| 2013/0130725 | A1* | 5/2013 | Forutanpour | H04W 24/00 455/456.6 |
| 2013/0332065 | A1* | 12/2013 | Hakim | G01S 5/0263 701/472 |
| 2014/0121962 | A1 | 5/2014 | Rao et al. | |
| 2014/0236412 | A1* | 8/2014 | Sung | B62D 15/0285 701/23 |
| 2019/0286134 | A1 | 9/2019 | Niesen et al. | |
| 2021/0097739 | A1* | 4/2021 | Xie | G06T 7/20 |

FOREIGN PATENT DOCUMENTS

| | | | |
|---|---|---|---|
| CN | 109974736 | A | 7/2019 |
| CN | 110274589 | A * | 9/2019 |
| CN | 110274589 | A | 9/2019 |
| CN | 110873888 | A | 3/2020 |
| CN | 111912405 | A * | 11/2020 |
| JP | H0423106 | A | 1/1992 |
| JP | 2004114977 | A | 4/2004 |
| JP | 2004297808 | A | 10/2004 |
| JP | 2004356845 | A | 12/2004 |
| JP | 2004356846 | A | 12/2004 |
| KR | 20140104611 | A | 8/2014 |

OTHER PUBLICATIONS

Haiqiao Liu et al., "Method for Adaptive Robust Four-Wheel Localization and Application in Automatic Parking System", IEEE Sensors Journal., vol. 10, No. 22, Nov. 15, 2019.
Oct. 9, 2021—(CN) Office Action—App. No. 2020107003769.
Oct. 9, 2021 (First communicated)—(CN) Search Report—App. No. 2020107003769.
Mar. 22, 2022—(KR) Office Action—Application No. 10-2021-0038045.
May 31, 2022—(JP) Office Action—App No. 2021-049152.

* cited by examiner

DEAD RECKONING METHOD AND APPARATUS FOR VEHICLE, DEVICE AND STORAGE MEDIUM

CROSS-REFERENCE TO RELATED APPLICATION

This application claims priority to Chinese patent application No. 202010700376.9, filed on Jul. 20, 2020, which is hereby incorporated by reference in its entirety.

TECHNICAL FIELD

The present application relates to the field of vehicles, in particular to the fields of vehicle control, intelligent driving and automatic driving.

BACKGROUND

A dead reckoning system for a vehicle mostly includes an inertial measurement unit (IMU) and a vehicle speed sensor. Firstly, three-axis gyroscope and three-axis acceleration information of the IMU are integrated to obtain apriori predictions of the attitude, speed and position of a vehicle. Then, a speed state of the vehicle is corrected by adopting a Kalman filtering model, to obtain a posteriori position and attitude estimation.

SUMMARY

The present application provides a dead reckoning method and apparatus for a vehicle, a device and a storage medium.

According to one aspect of the present application, the present application provides a dead reckoning method for a vehicle, which may include:

obtaining a position and attitude increment of the vehicle on the basis of wheel speed information of the vehicle; and performing dead reckoning on a position and attitude of the vehicle at a current moment, on the basis of the position and attitude increment of the vehicle and the position and attitude of the vehicle at a previous moment.

According to another aspect of the present application, there is provided a dead reckoning apparatus for a vehicle, which may include:

an increment module configured for obtaining a position and attitude increment of the vehicle on the basis of wheel speed information of the vehicle; and a reckoning module configured for performing dead reckoning on a position and attitude of the vehicle at a current moment, on the basis of the position and attitude increment of the vehicle and the position and attitude of the vehicle at a previous moment.

It should be understood that the content described in this section is intended neither to identify the key or important features of the embodiments of the present application, nor to limit the scope of the present application. Other features of the present application will be easily understood from the following description.

BRIEF DESCRIPTION OF THE DRAWINGS

The drawings are provided for better understanding of the present application, rather than limiting the present application. In which.

DETAILED DESCRIPTION

Exemplary embodiments of the present application are described below in combination with the accompanying drawings, including various details of the embodiments of the present application to facilitate the understanding, and they should be considered as merely exemplary. Thus, it should be realized by those of ordinary skill in the art that various changes and modifications can be made to the embodiments described here without departing from the scope and spirit of the present application. Also, for the sake of clarity and conciseness, the contents of well-known functions and structures are omitted in the following description.

A dead reckoning system for a vehicle mostly includes an inertial measurement unit (IMU) and a vehicle speed sensor. Firstly, three-axis gyroscope and three-axis acceleration information of the IMU are integrated to obtain apriori predictions of the attitude, speed and position of a vehicle. Then, a speed state of the vehicle is corrected by adopting a Kalman filtering model, to obtain a posteriori position and attitude estimation.

However, this observation only involves vehicle speed information, and only the speed state can be corrected. In dead reckoning (DR) with a long distance, there may be a large accumulated error, and it is difficult to meet the precision requirements of dead reckoning in scenes with poor positioning signals, such as a long tunnel, a valley and the like.

Figure 1:
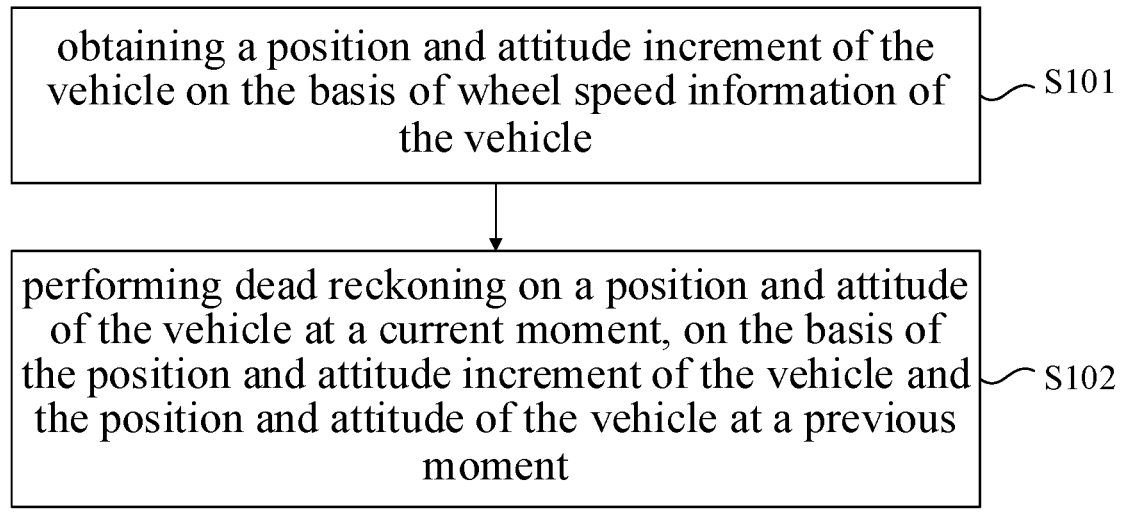
FIG. 1 is a flowchart of a dead reckoning method for a vehicle according to an embodiment of the present application.

FIG. 1 is a flowchart of a dead reckoning method for a vehicle according to an embodiment of the present application, which may include:

S101, obtaining a position and attitude increment of the vehicle on the basis of wheel speed information of the vehicle; and S102, performing dead reckoning on a position and attitude of the vehicle at a current moment, on the basis of the position and attitude increment of the vehicle and the position and attitude of the vehicle at a previous moment.

According to the technical solution of the present application, the position and attitude increment is obtained by using the wheel speed information, and then dead reckoning is performed by using the position and attitude increment, so that an accumulated error can be reduced and the precision of a dead reckoning result can be improved.

Dead reckoning generally means accumulating displacement vectors on an initial position to calculate a current position, and the dead reckoning is a process of information accumulation. In the case where poor signal quality of a global positioning system (GPS)/global navigation satellite system (GNSS) leads to difficult or impossible positioning, a current position may be obtained by performing dead reckoning using information from various sensors (gyroscope sensors, accelerometers, speed pulses, etc.), and high-precision positioning can be maintained. Dead reckoning may be applied to scenes such as vehicle navigation and the like. For example, the dead reckoning method for a vehicle in an embodiment of the present application is executed by a vehicle controller, to obtain accurate information such as a position and attitude and a speed and assist navigation. Vehicles in embodiments of the present application may include manually operated vehicles, automatically driven vehicles, and the like.

The wheel speed information of the vehicle may include a rotational speed of the wheel, which can be measured by a wheel speed sensor or the like. For example, in a case where a vehicle has four wheels, the rotational speed of each wheel can be measured by using a wheel speed sensor during the driving of the vehicle. The vehicle usually has only one vehicle speed at the same time, but the rotational speeds of different wheels of the vehicle may be different, especially in the scene such as turning or the like, the rotational speeds of the left and right wheels may be different.

Illustratively, position and attitude information of the vehicle may include position coordinates and a body attitude angle of the vehicle. The position and attitude increment may include a position increment and an attitude increment. For example, the attitude increment may include a heading increment.

In the embodiment, under the condition that GPS/GNSS signal quality is poor, the dead reckoning method for a vehicle in the embodiment of the present application can be adopted, in which a position and attitude increment of the vehicle is obtained on the basis of wheel speed information, and then a position and attitude observation of the vehicle at the current moment is obtained on the basis of the position and attitude increment of the vehicle and the position and attitude of the vehicle at the previous moment. A posteriori position and attitude estimation is obtained on the basis of the position and attitude observation at the current moment, a position and attitude apriority and a Kalman filtering model, thus the dead reckoning precision can be improved.

In the case that GPS/GNSS signal quality is good, a dead reckoning method for a vehicle in the related technology may be adopted through: integrating three-axis gyroscope and three-axis acceleration information of an IMU, to obtain apriori prediction of the attitude, the speed and the position of the vehicle; adopting a Kalman filtering model, converting a vehicle speed observation into a navigation coordinate system, correcting a vehicle speed state, and obtaining a posteriori position and attitude estimation.

According to the embodiment of the present application, the position and attitude increment is obtained by using the wheel speed information, and then dead reckoning is performed by using the position and attitude increment, so that the accumulated error can be reduced, and the precision of a dead reckoning result can be improved.

Figure 2:
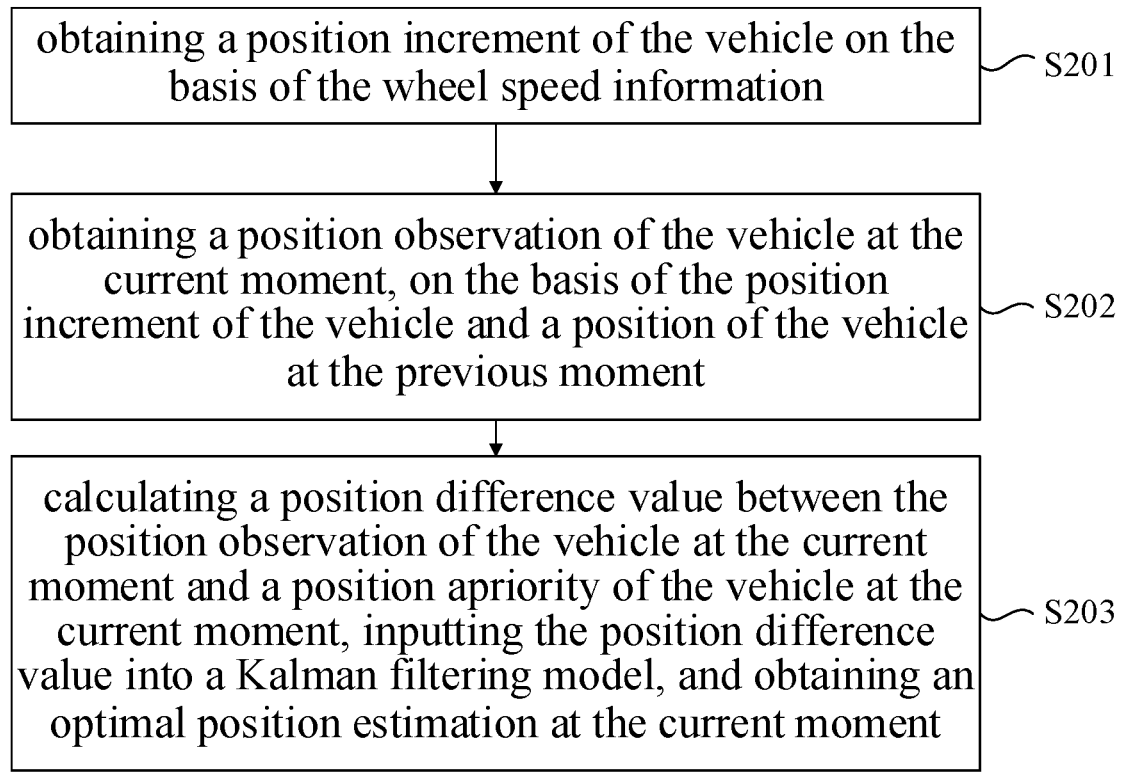
FIG. 2 is a flowchart of a dead reckoning method for a vehicle according to another embodiment of the present application.

FIG. 2 is a flowchart of a dead reckoning method for a vehicle according to another embodiment of the present application. The dead reckoning method for a vehicle in this embodiment may include respective steps of the embodiment described above. In this embodiment, in one possible implementation, S101 may include:

S201, obtaining a position increment of the vehicle on the basis of the wheel speed information.

In the embodiment, the position increment is obtained by using the wheel speed information, and the dead reckoning is performed by using the position increment, so that the accumulated error of the vehicle position can be reduced, and the precision of the dead reckoned vehicle position can be improved.

In one possible implementation, S201 may include:

calculating a motion arc length of a center of a rear axle on the basis of a left wheel speed, a right wheel speed, a wheel radius and a time length between adjacent moments; and calculating the position increment of the vehicle on the basis of the motion arc length of the center of the rear axle and a heading angle.

Typically, the rear axle of a vehicle is non-steerable, with the rear axle connecting two rear wheels. In this embodiment, the left wheel speed may be the wheel speed of a left rear wheel to which the rear axle is connected, and the right wheel speed may be the wheel speed of a right rear wheel to which the rear axle is connected.

Illustratively, in a case where the left wheel speed is $w_l$, the right wheel speed is $w_r$, the wheel radius is r, and the time length between adjacent moments is dt, the motion arc length $d_{center}$ of the center of the rear axle can be calculated using the following equation:

$$d_{center} = \frac{1}{2}(w_l + w_r) \times r \times dt.$$

Illustratively, in a case where the motion arc length of the center of the rear axle is $d_{center}$ and the heading angle is $\theta$, the position increment of the vehicle, $\Delta$wheel_pos, can be calculated using the following equation:

$$\Delta\text{wheel\_pos} = \begin{pmatrix} d_{center}\cos(\theta) \\ d_{center}\sin(\theta) \\ 0 \end{pmatrix},$$

For example, the navigation coordinate system is an east-north-up coordinate system, x axis represents the east direction, y axis represents the north direction, z axis represents the up direction, $d_{center}\cos(\theta)$ represents the position increment of the wheel in the x axis direction, $d_{center}\sin(\theta)$ represents the position increment of the wheel in the y axis direction, and 0 represents the position increment of the vehicle in the z axis direction.

In the embodiment, the motion arc length of the center of the rear axle is calculated on the basis of the left wheel speed of the rear axle, the right wheel speed of the rear axle, the wheel radius and the time length between adjacent moments. The position increment of the vehicle is calculated on the basis of the motion arc length and the heading angle of the center of the rear axle, and the dead reckoning can be performed by utilizing the position increment, so that the accumulated error of the vehicle position can be reduced, and the precision of the dead reckoned vehicle position can be improved.

In one possible implementation, S102 may include:

S202, obtaining a position observation of the vehicle at the current moment, on the basis of the position increment of the vehicle and a position of the vehicle at the previous moment.

Illustratively, in a case where _state_at_wheel_prev represents the position of the vehicle at the previous moment and $z_{wheel\_pos}$ represents the position observation derived from the wheel speed at the current moment, $z_{wheel\_pos}$=_state_at_wheel_prev+Δwheel_pos.

In the embodiment, the position observation of the vehicle at the current moment can be obtained by utilizing the position increment and the position at the previous moment, so that a more accurate vehicle position can be obtained.

In one possible implementation, S102 may further include:

S203, calculating a position difference value between the position observation of the vehicle at the current moment and a position apriority of the vehicle at the current moment, inputting the position difference value into a Kalman filtering model, and obtaining an optimal position estimation at the current moment.

Illustratively, in a case where _state_at_wheel represents the position of the vehicle at the current moment and $h_{wheel\_pos}$ represents the position apriority at the current moment, $h_{wheel\_pos}$=_state_at_wheel. The difference value $inno_{wheel\_pos}$ between the position observation $z_{wheel\_pos}$ and the position apriority may be expressed as:

$$inno_{wheel\_pos} = z_{wheel\_pos} - h_{wheel\_pos};$$

the $inno_{wheel\_pos}$ is input into the Kalman filtering model, to obtain an optimal position estimation of the vehicle at the current moment.

Illustratively, the position apriority $h_{wheel\_pos}$ at the current moment can be obtained using a motion equation, with reference to a position prediction equation below:

$$p_{k+1}=p_k+v_k\times d_t.$$

where, $p_{k+1}$ is the position apriority $h_{wheel\_pos}$ at the current moment (moment k+1), $p_k$ is the position of the vehicle at the previous moment (moment k), $v_k$ is the speed of the vehicle in the east, north and up directions at the previous moment, and $d_t$ is the time length between adjacent moments. Here, a time interval between the moment k+1 and the moment k is $d_t$.

In the embodiment, the position difference value between the position observation at the current moment and the position apriority of the vehicle at the current moment is input into the Kalman filtering model, so that a more accurate optimal position estimation at the current moment is obtained.

Figure 3:
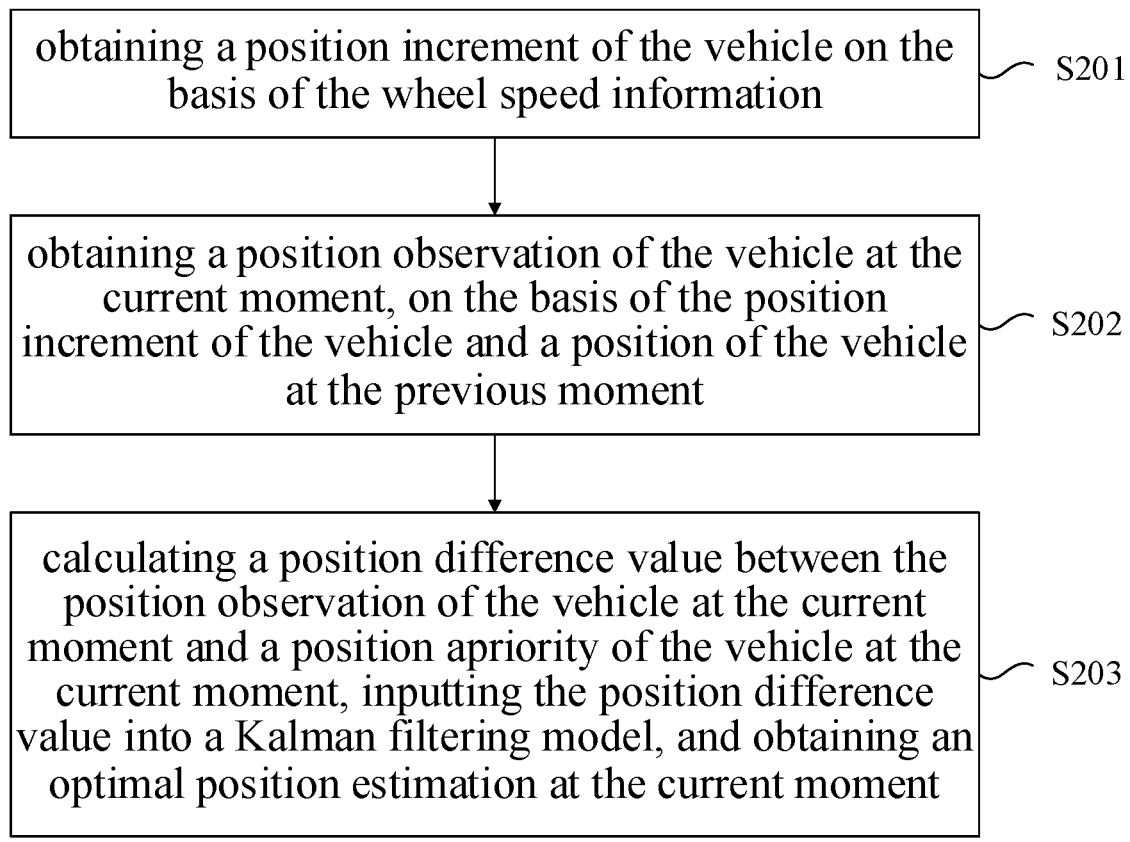
FIG. 3 is a flowchart of a dead reckoning method for a vehicle according to another embodiment of the present application.

FIG. 3 is a flowchart of a dead reckoning method for a vehicle according to another embodiment of the present application. The dead reckoning method for a vehicle of this embodiment may include respective steps of any of the embodiments described above. In this embodiment, in one possible implementation, S101 may include:

S301, obtaining a heading increment of the vehicle on the basis of the wheel speed information.

In the embodiment, the heading increment is obtained by using the wheel speed information, and the dead reckoning is performed by using the heading increment, so that the accumulated error of the vehicle heading can be reduced, and the precision of the dead reckoned vehicle heading can be improved.

In one possible implementation, S301 may include:

calculating a heading angular speed of the vehicle on the basis of a difference value between a left wheel speed and a right wheel speed, a wheel track and a wheel radius; and calculating the heading increment of the vehicle on the basis of the heading angular speed of the vehicle and a time length between adjacent moments.

Although there is an accumulated error in the position estimation using the wheel speed, the reckoning at adjacent moments is stable and credible. Therefore, the wheel speeds at adjacent moments can be selected for position increment reckoning.

Illustratively, the heading angular speed $\omega_t$ of the vehicle can be expressed as $$\omega_t = \frac{w_r - w_l}{L} * r$$

on the basis of the difference value between the left wheel speed $w_l$ and the right wheel speed $w_r$, as well as the wheel track L of the rear axle of the vehicle and the wheel radius r.

Illustratively $$\omega_t = \frac{d_\theta}{d_t}, d_\theta$$

resents the heading increment, $d_t$ represents the time length between adjacent moments, and $d_t$ may approach to 0. The heading increment Δwheel_theta (i.e., $d_\theta$) can be expressed as Δwheel_theta=$\omega_t$dt.

In the embodiment, the difference value between the left wheel speed and the right wheel speed, the wheel track and the wheel radius can be used to calculate the heading angular speed of the vehicle; and the heading increment of the vehicle is calculated on the basis of the heading angular speed of the vehicle and the time length between adjacent moments. Then, the dead reckoning can be performed by utilizing the heading increment, so that the accumulated error of the vehicle heading can be reduced, and the precision of the dead reckoned vehicle heading can be improved.

In one possible implementation, S102 may include:

S302, obtaining a heading observation of the vehicle at the current moment, on the basis of the heading increment of the vehicle and a heading angle of the vehicle at the previous moment.

Although there is an accumulated error in heading estimation using the wheel speed, the reckoning at adjacent moments is stable and credible. Therefore, the wheel speeds at adjacent moments can be selected for heading increment reckoning.

Illustratively, in a case where _state_at_wheel_prev represents the heading of the vehicle at the previous moment, Δwheel_heading represents the heading increment derived from the wheel speed from the previous moment to the current moment, and $z_{wheel\_heading}$ represents the heading observation derived from the wheel speed at the current moment, $z_{wheel\_heading}$=_state_at_wheel_prev+ Δwheel_theta.

In the embodiment, the heading observation of the vehicle at the current moment can be obtained by utilizing the heading increment and the position at the previous moment, so that a more accurate heading of the vehicle can be obtained.

In one possible implementation, S102 may further include:

S303, calculating a heading difference value between the heading observation of the vehicle at the current moment and a heading apriority of the vehicle at the current moment, inputting the heading difference value into a Kalman filtering model, and obtaining an optimal heading estimation at the current moment.

Illustratively, in a case where $h_{wheel\_heading}$ represents the heading apriority at the current moment and _state_at_wheel represents the heading of the vehicle at the current moment, $h_{wheel\_heading}$=_state_at_wheel. The difference value $inno_{wheel\_heading}$ between the heading observation and the heading apriority can be expressed as:

$$inno_{wheel\_heading}=z_{wheel\_heading}-h_{wheel\_heading};$$

The $inno_{wheel\_heading}$ is input into the Kalman filtering model, to obtain the optimal heading estimation of the vehicle at the current moment.

Illustratively, the heading apriority $h_{wheel\_heading}$ at the current moment can be obtained using a motion equation, with reference to the attitude prediction equation below:

$$q_{k+1} = q_k \otimes \begin{pmatrix} 1 \\ \frac{1}{2}(\omega_{k+1} - \omega_{b_k}) \times d_t \end{pmatrix}$$

where, $q_{k+1}$ represents a vehicle attitude quaternion at the current moment, $q_k$ represents the vehicle attitude quaternion at the previous moment, $\omega_{k+1}$ represents a measured value of the IMU three-axis gyroscope at the current moment, $\omega_{b_k}$ is a walk noise of the IMU three-axis gyroscope estimated by an algorithm, and $\otimes$ represents a multiplication operation of the quaternion. For example, taking the vehicle attitude including the heading angle as an example, $q_{k+1}$ is substituted into the heading angle at the current moment and $q_k$ is substituted into the heading angle at the previous moment.

Illustratively, the optimal position estimation and the optimal heading estimation of the vehicle at the current moment can be obtained by inputting the position difference value and the heading difference value into the Kalman filtering model, respectively. See the following equation:

Posterior position and attitude estimation $\hat{x}_{k+1}$:

$$\hat{x}_{k+1}=\bar{x}_k+K_{k+1}(z_{k+1}-h(\bar{x}_k))$$

where, $\bar{x}_k$ is an apriori prediction of the position and attitude state, $K_{k+1}$ is the Kalman filtering gain, $z_{k+1}$ is the state observation at the current moment, and $h(\bar{x}_k)$ is an apriori prediction of the position and attitude state in the observation coordinate system. For example, $h(\bar{x}_k)$ is the position apriority at the previous moment, $z_{k+1}$ is the position observation at the current moment, and $z_{k+1}-h(\bar{x}_k)$ is the position difference value. As another example, $h(\bar{x}_k)$ is the heading apriority at the previous moment, $z_{k+1}$ is the heading observation at the current moment, and $z_{k+1}-h(\bar{x}_k)$ is the heading difference value.

updating a posterior position and attitude covariance matrix $\hat{P}_{k+1}$:

$$\hat{P}_{k+1}=(I-K_{k+1}H)\bar{P}_k.$$

where, $K_{k+1}$ is the Kalman filtering gain, H is the observation matrix, and $\bar{P}_k$ is the covariance matrix at the previous moment.

In the embodiment, the heading difference value between the heading observation at the current moment and the position apriority of the vehicle at the current moment is input into the Kalman filtering model, so that the obtained optimal heading estimation at the current moment is more accurate.

Figure 4:
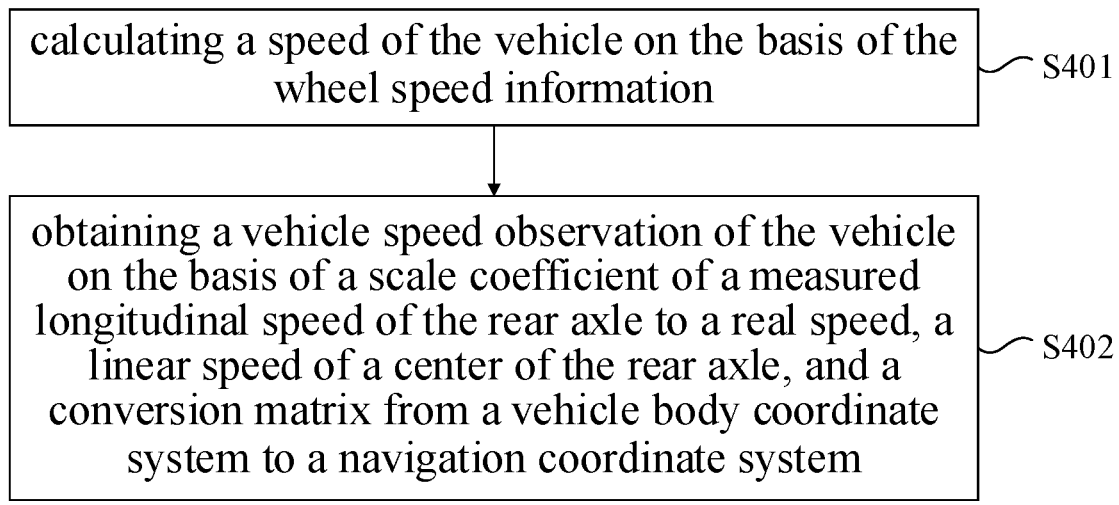
FIG. 4 is a flowchart of a dead reckoning method for a vehicle according to another embodiment of the present application.

FIG. 4 is a flowchart of a dead reckoning method for a vehicle according to another embodiment of the present application. The dead reckoning method for a vehicle of this embodiment may include respective steps of any of the embodiments described above. In this embodiment, in one possible implementation, the method may further include:

S401, calculating a speed of the vehicle on the basis of the wheel speed information.

In the embodiment, the speed of the vehicle is obtained by using the wheel speed information, and the dead reckoning is performed by using the speed of the vehicle, so that the observation quantity of the dead reckoning can be enriched, the accumulated error caused by an IMU can be reduced, and the precision of the dead reckoned vehicle speed can be improved.

In one possible implementation, S401 may include:

calculating a left wheel linear speed and a right wheel linear speed on the basis of a left wheel speed, a right wheel speed and a wheel radius; and calculating a linear speed of a center of a rear axle on the basis of the left wheel linear speed and the right wheel linear speed.

In the embodiment, the left wheel linear speed and the right wheel linear speed are calculated on the basis of the left wheel speed, the right wheel speed and the wheel radius, the average value of the left wheel linear speed and the right wheel linear speed is calculated to obtain the linear speed of the center of the rear axle, and the linear speed of the center of the rear axle is taken as the speed of the vehicle, so that the obtained speed of the vehicle is more accurate.

Illustratively, in a case where the left wheel speed is $w_l$ and the right wheel speed is $w_r$, the left wheel linear speed $v_l$ and the right wheel linear speed $v_r$ may be respectively expressed as:

$$v_l=w_l \times r;$$

$$v_r=w_r \times r.$$

Thus, the linear speed $v_m$ of the center of the rear axle is equal to the average value of the left wheel linear speed $v_l$ and the right wheel linear speed $v_r$, i.e., $$v_m = \frac{1}{2}(v_l + v_r) = \frac{1}{2}(w_l + w_r) \times r.$$

In one possible implementation, the method may further include:

S402, obtaining a vehicle speed observation of the vehicle on the basis of a scale coefficient of a measured longitudinal speed of the rear axle to a real speed, a linear speed of a center of the rear axle, and a conversion matrix from a vehicle body coordinate system to a navigation coordinate system.

Illustratively, assuming that the scale coefficient of the measured longitudinal speed of the rear axle to the real speed is scale, the conversion matrix from the vehicle body coordinate system to the navigation coordinate system is $C_b^n$, n refers to navigation, b refers to the vehicle body, and the linear speed of the center of the rear axle is $v_m$.

In a case where a longitudinal direction in the vehicle body coordinate system is taken as x axis, a transversal direction is taken as y axis, and a vertical direction is taken as z axis, $v_x$, $v_y$ and $v_z$ represent the speeds of the vehicle in the longitudinal direction, the transversal direction and the vertical direction respectively, and the vehicle speed observation $z_{wheel}$ of the vehicle can be:

$$z_{wheel} = C_b^n \begin{pmatrix} v_x \\ v_y \\ v_z \end{pmatrix} \times scale.$$

Wherein, $$v_x = v_m = \frac{1}{2}(w_l + w_r) \times r,$$

$v_y$ and $v_z$ may be 0.

In the embodiment, the speed of the vehicle is obtained by utilizing the wheel speed information, and the speed is converted from the vehicle body coordinate system to the navigation coordinate system by utilizing the conversion matrix of the Kalman filtering model, so that the observation quantity of the dead reckoning can be enriched, the accumulated error caused by the IMU can be reduced, and the precision of the dead reckoned vehicle speed can be improved.

Figure 5:
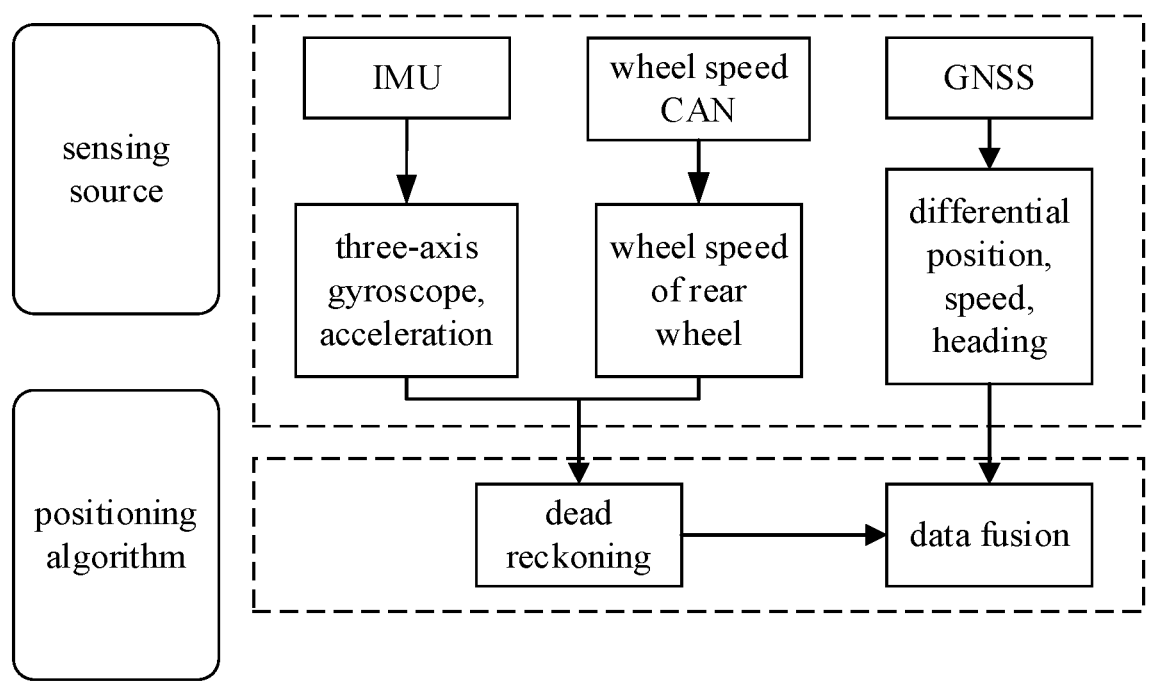
FIG. 5 is a schematic diagram of an exemplary architecture of a positioning system.

In one application example, as shown in FIG. 5, a positioning system based on a low cost IMU and a wheel speed may include: a consumer-level IMU, a wheel speed controller area network (CAN) and global navigation satellite system (GNSS) sensor data. The three-axis angular speed and acceleration can be obtained according to the IMU, and be used for an apriori estimation of the position and attitude. Herein, the wheel speed CAN can analyze the wheel speed of the rear wheel, for the position and attitude observation in the dead reckoning. The GNSS can obtain the speed, position and heading of the current vehicle, for data fusion and accurate positioning under normal difference.

First part: position and attitude apriority and Kalman filtering model 1.1 Attitude prediction:

$$q_{k+1} = q_k \otimes \begin{pmatrix} 1 \\ \frac{1}{2}(\omega_{k+1} - \omega_{b_k}) \times d_t \end{pmatrix}$$

where, $q_{k+1}$ represents a vehicle attitude quaternion at the current moment, $q_k$ represents the vehicle attitude quaternion at the previous moment, $\omega_{k+1}$ represents a measured value of an IMU three-axis gyroscope at the current moment, $\omega_{b_k}$ is a walk noise of the IMU three-axis gyroscope estimated by an algorithm, and $\otimes$ represents a multiplication operation of the quaternion.

1.2 Speed Prediction:

$$v_{k+1} = v_k + C_b^n \times (a_{k+1} - a_{b_k}) - \begin{pmatrix} 0 \\ 0 \\ g \end{pmatrix} d_t$$

where, $v_{k+1}$ represents the speed of the vehicle in the east, north and up directions at the current moment, $v_k$ represents the speed of the vehicle at the previous moment, $a_{k+1}$ represents an measured value of an IMU three-axis acceleration at the current moment, $a_{b_k}$ is a walk noise of the IMU three-axis acceleration estimated by an algorithm, and the conversion matrix from the body coordinate system to the navigation coordinate system is $C_b^n$.

1.3 Position Prediction:

$$p_{k+1} = p_k + v_k \times d_t$$

where, $p_{k+1}$ is the position apriority $h_{wheel\_pos}$ at the current moment, $p_k$ is the position of the vehicle at the previous moment, $v_k$ is the speed of the vehicle in the east, north and up directions at the previous moment, and $d_t$ is the time length between adjacent moments.

1.4 Prediction State $\bar{x}_k$ and Covariance Matrix $\bar{P}_k$:

In a case where the attitude prediction is expressed as $f(\hat{x}_k, u_{k+1})$, where $\hat{x}_k$ is the optimal position and attitude estimation, and $u_{k+1}$ is a system input at the current moment. For example, the system input may include an angular speed, an acceleration and the like measured by a gyroscope.

$\bar{x}_{k+1} = f(\hat{x}_k, u_{k+1})$, an apriori prediction of the position and attitude at the current moment can be obtained by substituting the optimal position and attitude estimation at the previous moment into this equation.

$$\bar{P}_{k+1} = F\hat{P}_k F^T + GQ_{k+1}G^T$$

where, $F\hat{P}_{k-1}F^T$ is a state covariance, and F is derived from a state transition equation, for example:

$$F = \frac{\partial f(x_k, u_{k+1})}{\partial x},$$

which represents a partial derivative of the position and attitude prediction $f(x_k, u_{k+1})$ to the position and attitude state x, where $x_k$ represents the position and attitude state at the previous moment and $u_{k+1}$ represents a system input at the current moment.

Where, $GQ_k G^T$ is a covariance update of the noise term, and G is derived from a noise-driven equation, for example:

$$G = \frac{\partial f(x_k, u_{k+1})}{\partial u},$$

which represents a partial derivative of the attitude prediction $f(x_k, u_{k+1})$ to a system input u.

1.5 Updating the Kalman Gain $K_{k+1}$:

$$K_{k+1} = \bar{P}_k H^T (H\bar{P}_k H^T + R_{k+1})^{-1}$$

where, H is an observation matrix, $R_{k+1}$ is an observation noise matrix, and $\bar{P}_k$ is the covariance matrix at the previous moment. $H^T$ is the transpose of H.

1.6 Posterior Position and Attitude Estimation $\hat{x}_{k+1}$:

$$\hat{x}_{k+1} = \bar{x}_k + K_{k+1}(z_{k+1} - h(\bar{x}_k))$$

where, $\bar{x}_k$ is the apriori prediction of the position and attitude state, $K_{k+1}$ is the Kalman filtering gain, $z_{k+1}$ is the state observation at the current moment, and $h(\bar{x}_k)$ is the apriori prediction of the position and attitude state in the observation coordinate system.

1.7 Updating the Posterior Position and Attitude Covariance Matrix $\hat{P}_{k+1}$:

$$\hat{P}_{k+1} = (I - K_{k+1}H)\overline{P}_k$$

where, $K_{k+1}$ is the Kalman filtering gain, H is the observation matrix, $\overline{P}_k$ is the covariance matrix at the previous moment, and I is the identity matrix.

Posterior position and attitude covariance matrix $\hat{P}_{k+1}$ can represent the uncertainty of current position and attitude estimation. In a case where the covariance matrix is larger, the uncertainty is higher. In a case where the covariance matrix is smaller, the uncertainty is lower. In addition, the Kalman filtering gain at the next moment can be updated by using $\hat{P}_{k+1}$ (see the equation of 1.5), and then the posterior position and attitude estimation at the next moment is calculated.

Second part: principle of dead reckoning using wheel speed information 2.1 Positioning Algorithm Flow.

Figure 6:
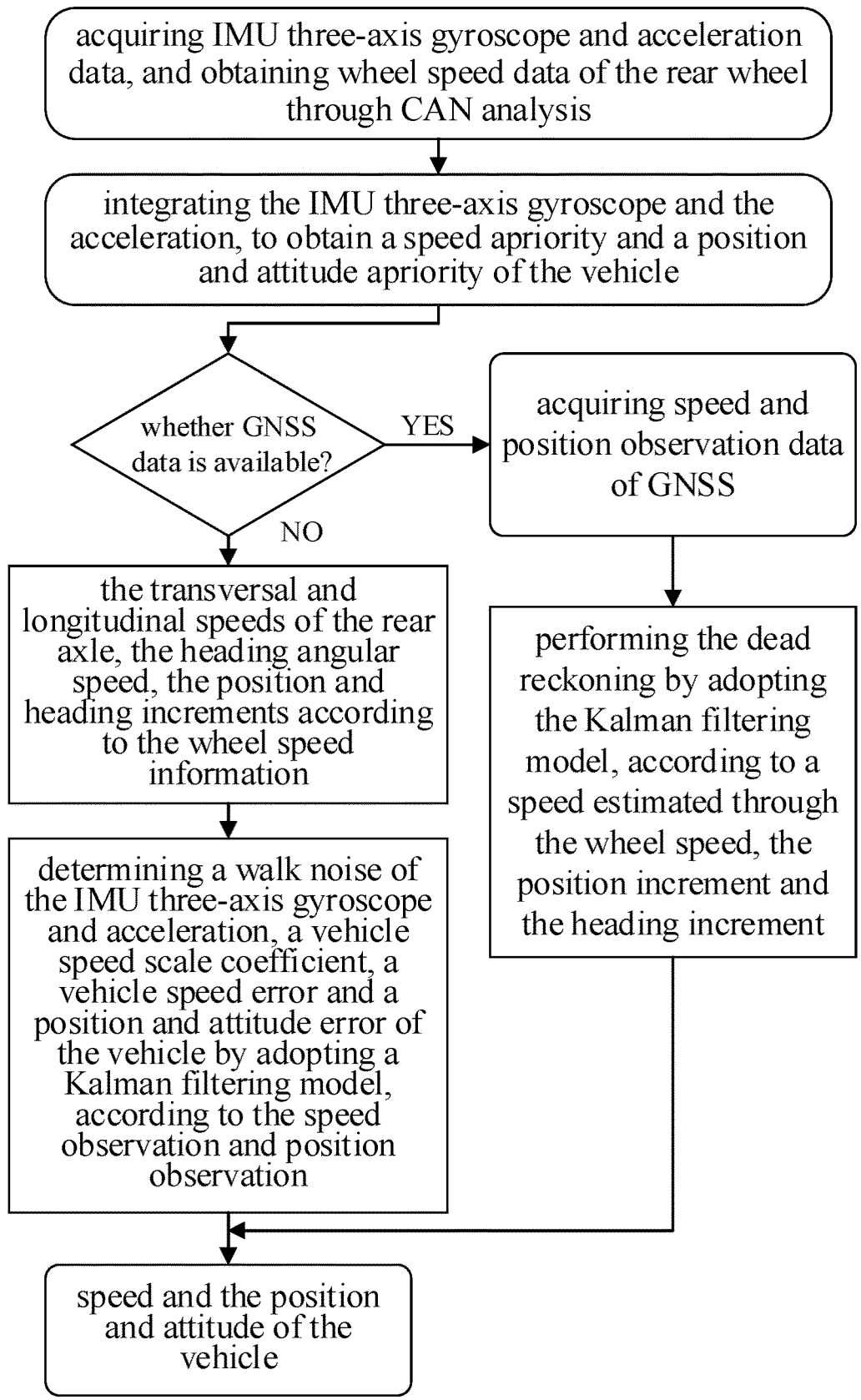
FIG. 6 is a schematic diagram of an exemplary operational process of a positioning system.

With reference to FIG. 6, an example of a positioning algorithm flow is shown. First, IMU three-axis gyroscope (angular speed) and acceleration data may be obtained. The three-axis gyroscope and acceleration data are integrated to obtain an apriori estimation of the speed and the position and attitude of the vehicle. Then, the system determines a differential state of a GNSS to determine whether GNSS data is available. For example, in a case where the quality of the GNSS is good and the GNSS data is available, data fusion is performed through a Kalman filtering model by utilizing the speed, position, heading information obtained by the GNSS and the longitudinal speed calculated by the wheel speed, the walk noise of the three-axis gyroscope and acceleration of the IMU, the scale coefficient of the vehicle speed, the vehicle speed and the position and attitude error are estimated. In a case where the quality of the GNSS is poor and the GNSS data is not available, the dead reckoning method in the embodiment of the present application is adopted for estimating the transversal and longitudinal speeds of the rear axle of the vehicle, the heading angular speed, the position increment and the heading increment by using the wheel speed information such as a rear wheel speed. Then, according to the speed, the position increment and the heading increment estimated through the wheel speed, the Kalman filtering model is adopted for dead reckoning. In turn, the optimal estimations of the speed and the position and attitude of the vehicle are obtained.

2.2 Implementation of Wheel Speed Observation Fusion

The longitudinal speed, the transversal speed, the heading angular speed and the position and attitude of the vehicle are estimated on the basis of the wheel speed information of rear wheels (the left rear wheel and the right rear wheel), in combination with the vehicle kinematics model. The estimated position and attitude is taken as the position and heading observation, and the Kalman filtering model is introduced, so that the dead reckoning performance of the algorithm and the positioning capability in low-speed and congested scenes are improved.

For example, the observation fusion of the wheel speed sensor mainly includes the following parts:

estimating the longitudinal speed, the transversal speed and the heading angular speed of the vehicle on the basis of the wheel speed information;

estimating the position increment and the heading increment on the basis of wheel speed information;

observation updating on the basis of the longitudinal speed, the transversal speed, the position increment and the heading increment of the vehicle.

2.3 Advantages of the Dead Reckoning

Due to the improvement of the dead reckoning capability, the positioning capability in the following scenes can be effectively improved:

improving the dead reckoning capability of the positioning system in a case where the GPS data quality is poor;

improving the positioning capability in low-speed and congested scenes (for example, the vehicle speed is less than 5 m/s); and improving the positioning capability in scenes such as large bends (a communication channel where two elevated roads meet, referred to as a system communication channel or a hub overpass, referred to as Junction in English, which can be simply referred to as JCT), sharp bends and the like.

Figure 7:
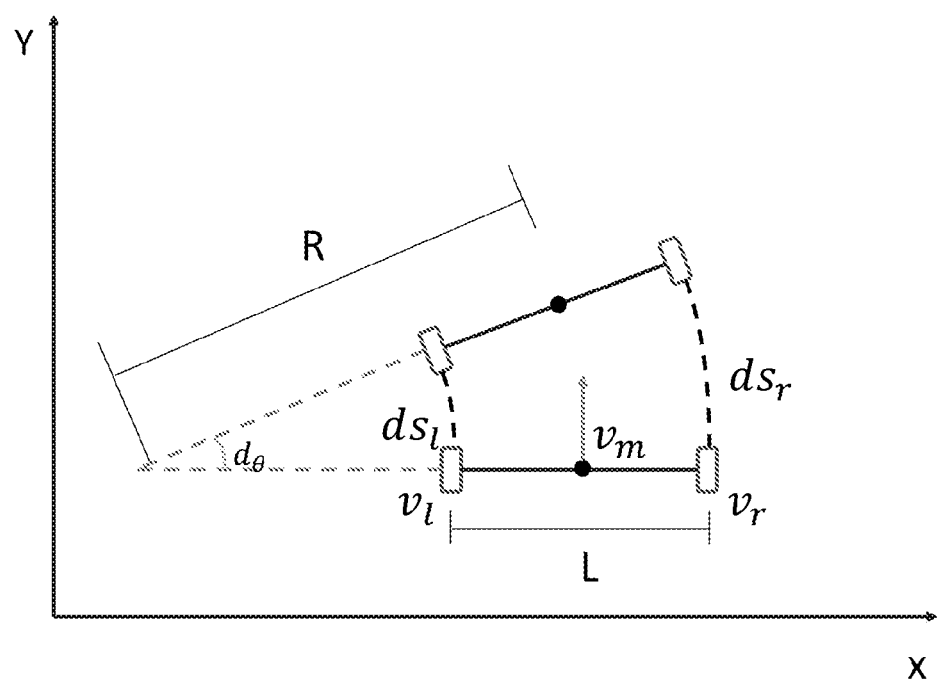
FIG. 7 is a schematic diagram of a wheel speed derivation principle.

2.4 Principle for Estimating the Longitudinal Speed, the Transversal Speed and the Heading Angular Speed of the Vehicle on the Basis of the Wheel Speed Taking the wheel speeds of two wheels of the real axle as an example, the transversal and longitudinal speeds and the heading angular speed of the vehicle are derived as follows:

with reference to FIG. 7, in the vehicle physical parameters, the wheel track is L and the wheel radius is r.

The left wheel speed $w_l$ and the right wheel speed $w_r$ can be obtained through a wheel speed sensor (which may also be referred to as a wheel speed meter), and, in a case where wheel-slip is not taken into consideration, the left wheel linear speed and the right wheel linear speed can be expressed as:

$$v_l = w_l \times r$$

$$v_r = w_r \times r$$

where, $v_l$ represents the left wheel linear speed and $v_r$ represents the right wheel linear speed.

The linear speed $v_m$ of the center of the rear axle can be derived from the left wheel linear speed and the right wheel linear speed, and the direction is perpendicular to the rear axle:

$$v_m = \frac{1}{2}(v_l + v_r) = \frac{1}{2}(w_l + w_r) \times r$$

In one possible implementation, the derivation principle of the heading increment may include:

the motion arc length increments of the left wheel and the right wheel $ds_l$ and $ds_r$ can be obtained on the basis of the left wheel speed $w_l$, the right wheel speed $w_r$, the wheel radius r and the time length between adjacent moments dt. The heading increment $d_\theta$ of the vehicle can be obtained on the basis of the motion arc length increments of the left wheel and the right wheel, and the wheel track L.

Illustratively, since the rear axle is a non-steerable wheel, the transversal speed of the center of the rear axle may be approximately considered to be zero. With reference to FIG. 7, the motion arc length increment $ds_l$ of the left wheel and the motion arc length increment $ds_r$ of the right wheel may be expressed as:

$$ds_l = \lim_{\Delta t \to 0} w_l \times r \times \Delta t = w_l \times r \times d_t$$

$$ds_r = \lim_{\Delta t \to 0} w_r \times r \times \Delta t = w_r \times r \times d_t$$

where, $\Delta t$ represents the time length between adjacent moments, approaching to 0, and thus $\Delta t$ can also be expressed as $d_t$.

The heading increment $d_\theta$ of the vehicle turned at any time is as follows:

$$d_\theta = \frac{\lim_{\Delta t \to 0}(ds_r - ds_l)}{L}.$$

In addition, the heading angular speed $\omega$ of the vehicle can be obtained on the basis of the heading increment of the vehicle and the time length between adjacent moments. A turning radius R can be obtained on the basis of the linear speed $v_m$ of the center of the rear axle and the heading angular speed.

Illustratively, the heading angular speed $\omega$ of the vehicle may be expressed as:

$$\omega = \frac{d_\theta}{d_t} = \frac{\lim_{\Delta t \to 0}(ds_r - ds_l)}{L d_t} = \frac{(w_r \times r - w_l \times r)d_t}{L d_t} = \frac{v_r - v_l}{L}.$$

Further, the turning radius R is the ratio of the linear speed $v_m$ of the center of the rear axle to the heading angular speed $\omega$, with reference to the following equation:

$$R = \frac{v_m}{\omega} = \frac{L(w_r + w_l)}{2(w_r - w_l)}.$$

2.5 Principle of Position and Attitude Reckoning on the Basis of Wheel Speed

In one possible implementation, the derivation principle of the position increment may include:

The position $(P_x, P_y)$ of a rotation center P can be obtained on the basis of the position (x, y) of the center of the rear axle at the previous moment, the heading angle $\theta$ of the center of the rear axle at the previous moment, and the turning radius R. The position (x', y') of the center of the rear axle at the current moment can be obtained on the basis of the position $(P_x, P_y)$ of the rotation center P, the position (x, y) of the center of the rear axle at the previous moment, the heading increment $\varphi$ and the motion arc length of the center of the rear axle. The position increment can be obtained on the basis of the position of the center of the rear axle at the current moment and the position of the center of the rear axle at the previous moment.

Figure 8:
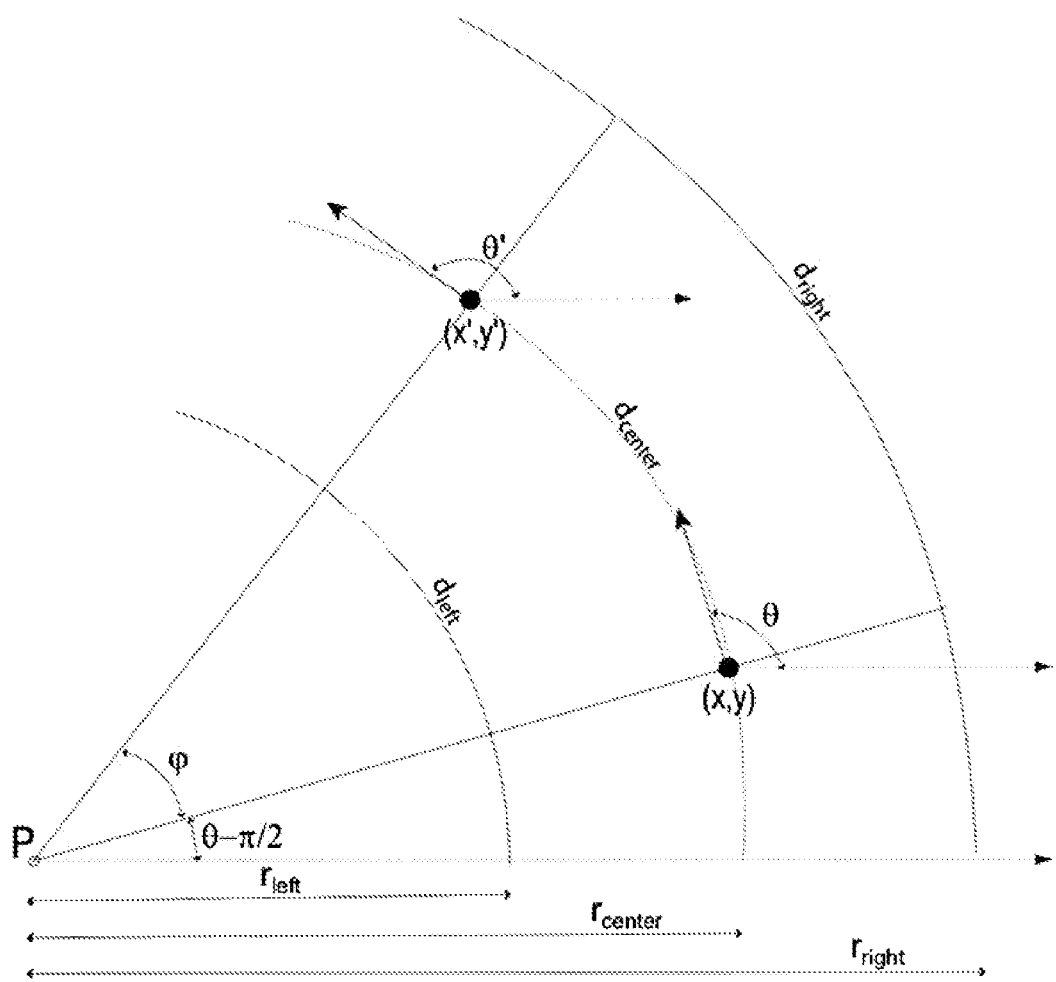
FIG. 8 is a schematic diagram of a wheel speed position and attitude reckoning principle.

Illustratively, as shown in FIG. 8, it is assumed that the vehicle is rotated by an angle $\varphi$ about the rotation center P over a time dt, $r_{center}$ is the turning radius of the center of the rear axle, $r_{left}$ is the turning radius of the left wheel of the rear axle, and $r_{right}$ is the turning radius of the right wheel of the rear axle.

Moving from the position and attitude (x, y, $\theta$) of the center of the rear axle at the previous moment to the position and attitude (x', y', $\theta$') of the center of the real axle at the current moment, the coordinates $(P_x, P_y)$ of the rotation center P can be expressed as:

$$P_x = x - r_{center}\cos\left(\theta - \frac{\pi}{2}\right) = x - r_{center}\sin(\theta)$$

$$P_y = y - r_{center}\sin\left(\theta - \frac{\pi}{2}\right) = y + r_{center}\cos(\theta).$$

where, $r_{center}$ is the turning radius R, or is also referred to as a rotation radius. The distance from P to the center (x, y) or (x', y') of the rear axle is $r_{center}$. (x, y) is the position of the center of the rear axle at the previous moment, and (x', y') is the position of the center of the rear axle at the current moment. $\theta$ is the heading angle of the center of the rear axle at the previous moment, and $\theta$' is the heading angle of the center of the rear axle at the current moment.

From the coordinates of the rotation center P, the coordinates of (x', y', $\theta$') can be derived as follows:

$$x' = P_x + r_{center}\cos\left(\varphi + \theta - \frac{\pi}{2}\right)$$
$$= x - r_{center}\sin(\theta) + r_{center}\sin(\varphi + \theta)$$
$$= x + r_{center}[-\sin(\theta) + \sin(\varphi)\cos(\theta) + \sin(\theta)\cos(\varphi)]$$

$$y' = P_y + r_{center}\sin\left(\varphi + \theta - \frac{\pi}{2}\right)$$
$$= y + r_{center}\cos(\theta) + r_{center}\cos(\varphi + \theta)$$
$$= y + r_{center}[\cos(\theta) - \cos(\varphi)\cos(\theta) + \sin(\theta)\sin(\varphi)]$$

Since a sampling interval of the wheel speed data is low (e.g., >=10 HZ), the heading increment $\varphi$ (i.e., the previously calculated $d_\theta$) is a small quantity close to 0, which can be approximated considered as:

$\sin(\varphi) = \varphi$ $\cos(\varphi) = 1$

Therefore, the coordinates of (x', y', $\theta$') can be simplified to:

$$x' = x + r_{center}[-\sin(\theta) + \varphi\cos(\theta) + \sin(\theta)]$$
$$= x + r_{center}\varphi\cos(\theta)$$
$$= x + d_{center}\cos(\theta)$$

$$y' = y + r_{center}[\cos(\theta) - \cos(\theta) + \varphi\sin(\theta)]$$
$$= y + r_{center}\varphi\sin(\theta)$$
$$= y + d_{center}\sin(\theta)$$

In the equations described above:

$$d_{center} = \frac{d_{left} + d_{right}}{2} = \frac{1}{2}(w_l + w_r) \times r \times d_t$$

$d_{center}$ represents the motion arc length of the center of the rear axle, $d_{left}$ (i.e., $ds_l$ as described above) and $d_{right}$ (i.e., $ds_r$ as described above) represent the motion arc lengths of the left and right wheels of the rear axle, respectively.

In addition, the heading angle $\theta$' of the center of the rear axle at the current moment can be obtained on the basis of the heading angle $\theta$ of the center of the rear axle at the previous moment and the heading increment $\varphi$ (i.e., $d_\theta$), with reference to the following equation:

$\theta' = \theta + \varphi = \theta + \omega d_t$ where, $\omega$ is the heading angular speed of the vehicle, and $d_t$ is the time length between adjacent moments.

2.6 Observation Updating on the Basis of the Longitudinal Speed and the Transversal Speed of the Vehicle and the Longitudinal Speed Scale of the Rear Axle According to the wheel speed model, the transversal and longitudinal speeds of the center of the rear axle of the vehicle are estimated, so that the estimated transversal and longitudinal speeds can be used as the speed observation, for state correction and updating.

The longitudinal speed of the vehicle can be derived from the wheel speed model described above. As the rear axle is a non-steering axle, the transversal and vertical speeds can be approximately considered to be zero. Assuming that, in the vehicle body coordinate system, the longitudinal direction is taken as x axis, the transversal direction is taken as y axis, and the vertical direction is taken as z axis, $v_x$, $v_y$, and $v_z$ represent speeds in the longitudinal direction, the transversal direction and the vertical direction of the vehicle. Here, $v_x$ may refer to the calculation way of the linear speed $v_m$ of the center of the rear axle described above. The computational equations for $v_x$, $v_y$, and $v_z$ can refer to the following equations:

$$v_x = \frac{1}{2}(w_l + w_r) \times r$$

$$v_y = v_z = 0$$

In addition, a scale error exists between the vehicle speed of the vehicle and the real longitudinal speed, i.e., there exists a scale coefficient scale between the measured longitudinal speed of the rear axle $wheel_{speed_{measurement}}$ and the real speed $wheel_{speed_{truth}}$, which can be estimated empirically, to make the vehicle achieve a more stable reckoning in the tunnel and other scenes.

Therefore, it can be considered that $wheel_{speed_{truth}} = wheel_{speed_{measurement}} \times scale$, and the observation equation for the vehicle speed is as follows:

$$z_{wheel} = C_b^n \begin{pmatrix} v_x \\ v_y \\ v_z \end{pmatrix} \times scale$$

where, $C_b^n$ is a coordinate rotation equation that represents the conversion matrix from the vehicle body coordinate system to the navigation coordinate system.

2.7 Observation Updating of Position on the Basis of Position Increment Estimated Through the Wheel Speed With reference to the derivation process described above, the conversion relationship of vehicle positions at adjacent moments can be estimated according to the wheel speed model:

$$x' = x + r_{center}[-\sin(\theta) + \varphi\cos(\theta) + \sin(\theta)]$$
$$= x + r_{center}\varphi\cos(\theta)$$
$$= x + d_{center}\cos(\theta)$$

$$y' = y + r_{center}[\cos(\theta) - \cos(\theta) + \varphi\sin(\theta)]$$
$$= y + r_{center}\varphi\sin(\theta)$$
$$= y + d_{center}\sin(\theta)$$

Thus, the position increment derived from the wheel speed at adjacent moments (e.g., in a case where the navigation coordinate system is a north-east-up coordinate system, the x axis represents the east direction, the y axis represents the north direction, and the z axis represents the up direction) may be represented as the flowing equation, where $d_{center}$ represents the motion arc length of the vehicle at adjacent moments, and θ represents the vehicle heading (included angle to the east direction):

$$\Delta wheel_{pos} = \begin{pmatrix} x' - x \\ y' - y \\ 0 \end{pmatrix} = \begin{pmatrix} d_{center}\cos(\theta) \\ d_{center}\sin(\theta) \\ 0 \end{pmatrix}$$

where, $$d_{center} = \frac{1}{2}(w_l + w_r) \times r \times d_t$$

can be known according to the aforementioned derivation.

In a case where the navigation coordinate system is changed, the calculation equations of the above vehicle heading and the like can be changed correspondingly.

Although there is an accumulated error in the position estimation using the wheel speed, the reckoning at adjacent moments is relatively stable and credible. Therefore, the wheel speeds at adjacent moments can be selected for position increment reckoning, wherein _state_at_ wheel_prev represents the position of the vehicle at the previous moment, Δwheel_pos represents the position increment derived by the wheel speed from the previous moment to the current moment, and _state_at_wheel represents the position of the vehicle at the current moment:

$$z_{wheel\_pos} = \_state\_at\_wheel\_prev + \Delta wheel\_pos$$

$$h_{wheel\_pos} = \_state\_at\_wheel$$

$z_{wheel\_pos}$ represents the position observation derived from the wheel speed at the current moment, $h_{wheel\_pos}$ represents the position apriority at the current moment, then the difference value between the position observation and the position apriority can be expressed as:

$$inno_{wheel\_pos} = z_{wheel\_pos} - h_{wheel\_pos}$$

2.8 Observation Updating of the Heading on the Basis of the Heading Increment by Wheel Speed Estimation The conversion relation of the vehicle heading at the adjacent moments is estimated according to the wheel speed model, thus the heading increment estimated by the wheel speed model can be used for observation updating, and the prediction precision of the heading is improved.

From the foregoing, the heading angular speed $\omega_t$ of a vehicle can be derived from the difference value between the left wheel speed $\omega_l$ and the right wheel speed $w_r$, where L represents the wheel track and r is the wheel radius:

$$\omega_t = \frac{d_\theta}{d_t} = \frac{w_r - w_l}{L} \times r$$

then, the heading increment between adjacent moments Δwheel_theta (i.e., $d_\theta$) can be expressed as:

$$\Delta wheel\_theta = \omega_t d_t$$

Although there is an accumulated error in the heading estimation using wheel speed, the reckoning at adjacent moments is relatively stable and credible. Therefore, the wheel speeds at adjacent moments can be selected for heading increment reckoning.

Assuming that _state_at_wheel_prev represents the heading of the vehicle at the previous moment, Δwheel_heading represents the heading increment derived from the wheel speed from the previous moment to the current moment, _state_at_wheel represents the heading of the vehicle at the current moment, and $d_t$ is the time length between adjacent moments:

$$z_{wheel\_heading} = \_state\_at\_wheel\_prev + \Delta wheel\_theta$$

$$h_{wheel\_heading} = \_state\_at\_wheel$$

$z_{wheel\_heading}$ represents the heading observation derived from the wheel speed at the current moment, $h_{wheel\_heading}$ represents the heading apriority at the current moment, then the difference value between the heading observation and the heading apriority can be expressed as:

$$inno_{wheel\_heading} = z_{wheel\_heading} - h_{wheel\_heading}$$

In addition, the difference value between the position observation and the position apriority and the difference value between the heading observation and the heading apriority can be substituted into the Kalman filtering model, to obtain a more accurate position and attitude estimation.

For example:

posterior position and attitude estimation $\hat{x}_{k+1}$:

$$\hat{x}_{k+1} = \bar{x}_{k+1}(z_{k+1} - h(\hat{x}_k))$$

where, $\bar{x}_k$ is the apriori prediction of the position and attitude state, $K_{k+1}$ is the Kalman filtering gain, $z_{k+1}$ is the state observation at the current moment, and $h(\bar{x}_k)$ is the apriori prediction of the position and attitude state in the observation coordinate system.

updating the posterior position and attitude covariance matrix $\hat{P}_{k+1}$:

$$\hat{P}_{k+1} = (I - K_{k+1}H)\bar{P}_k$$

where, $K_{k+1}$ is the Kalman filtering gain, H is the observation matrix, $\bar{P}_k$ is the covariance matrix at the previous moment, and I is the identity matrix. The covariance matrix $\hat{P}_{k+1}$ represents the uncertainty of the current position and attitude estimation. In a case where the covariance matrix is larger, the uncertainty is higher. In a case where the covariance matrix is smaller, the uncertainty is lower. In addition, the Kalman filtering gain at the next moment can be updated using $\hat{P}_{k+1}$, and then the posterior position and attitude estimation at the next moment is calculated.

Illustratively, the dead reckoning process for a vehicle is described below by substituting specific values into the main equations in the embodiments of the present application.

By using the wheel speed sensor, it can be obtained that the left wheel linear speed $v_l = w_l \times r = 14.063$ m/s, the right wheel linear speed $v_r = w_r \times r = 13.953$ m/s, the sampling interval between adjacent moments $d_t = 101$ ms, the wheel track L of the rear wheels is 1.935 m, and the vehicle heading θ of the last sampling interval is 160.337°.

The longitudinal speed of the vehicle $$v_m = \frac{v_l + v_r}{2} = \frac{(14.063 + 13.953)}{2} \text{m/s} = 14.008 \text{ m/s};$$

the motion arc length of the center of the rear axle $$d_{center} = \frac{v_l + v_r}{2} \times dt = 14.008 \times 101 \times 10^{-3} = 1.4148 \text{ m};$$

the position increment $$\Delta wheel_{pos} = \begin{pmatrix} d_{center} \cos(\theta) \\ d_{center} \sin(\theta) \\ 0 \end{pmatrix} = \begin{pmatrix} 1.4148 \times \cos(160.337) \\ 1.4148 \times \sin(16.0.337) \\ 0 \end{pmatrix} = \begin{pmatrix} -1.332 \text{ m} \\ 0.476 \text{ m} \\ 0 \text{ m} \end{pmatrix}$$

the heading angular speed of the vehicle $$\omega = \frac{v_r - v_l}{L} = \frac{13.953 - 14.063}{1.935} \text{rad/s} = -0.0568 \text{rad/s} = -3.258°/\text{s};$$

thus, the heading increment $\Delta wheel\_theta = \omega_r dt = -3.258°/s \times 101 \times 10^{-3} = -0.329°$.

In addition, in a case where the vehicle navigation coordinate position at the previous moment is _state_at_wheel_prev = (-452.789, 122.191, 0), the position and attitude observation at the current moment obtained from the wheel speed is $$z_{wheel\_pos} = \_state\_at\_wheel\_prev + \Delta wheel_{pos} =$$

$$\begin{pmatrix} -452.789 - 1.332 \text{ m} \\ 122.191 + 0.476 \text{ m} \\ 0 \text{ m} \end{pmatrix} = \begin{pmatrix} -454.121 \text{ m} \\ 122.667 \text{ m} \\ 0 \text{ m} \end{pmatrix};$$

$z_{wheel\_heading} = \_state\_at\_wheel\_prev + \Delta wheel\_theta = 160.337° - 0.329° = 160.008°$.

Then, the optimal position and attitude estimation can be obtained by inputting the position and attitude observation into the Kalman filtering model.

Figure 9:
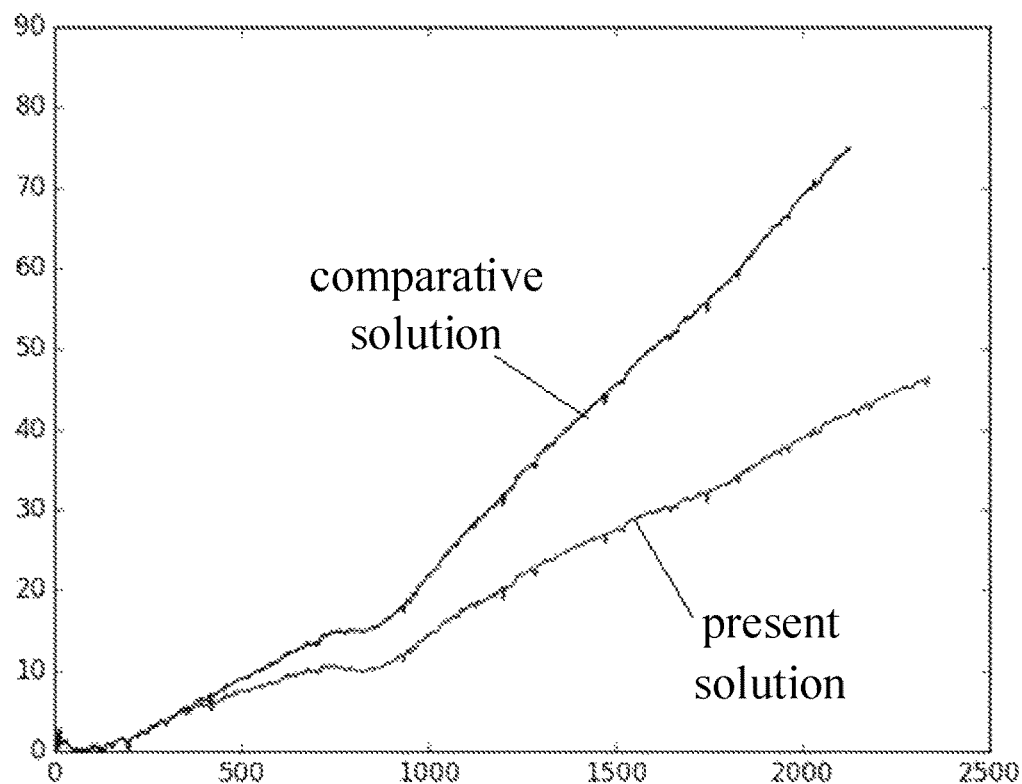
FIG. 9 is an exemplary diagram of a changing curve of a longitudinal position error as a function of reckoning distance in the dead reckoning.
Figure 10:
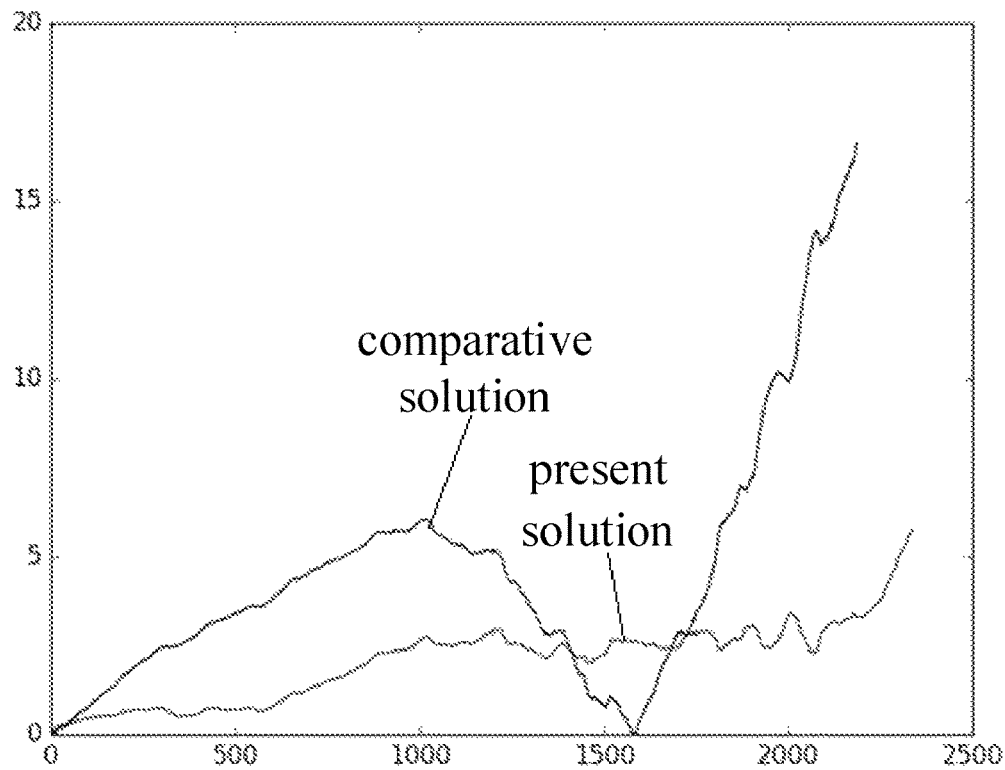
FIG. 10 is an exemplary diagram of a changing curve of a transversal position error as a function of reckoning distance in the dead reckoning.

As shown in FIGS. 9 and 10, the related method and the dead reckoning method of the present application are initialized in a scene of a 2.5 km tunnel and the transversal and longitudinal dead reckoning errors of the DR dead reckoning are compared. A changing curve of the transversal and longitudinal errors along with a dead reckoning distance is dead reckoned (the true value is high-precision combined inertial navigation SPAN-CPT data), with m as the unit. It can be seen that the dead reckoning method of the present application can remarkably reduce the dead reckoning error of the transversal and longitudinal positions of the positioning system within the dead reckoning distance of 2.5 km.

According to the present application, the wheel speed information is fully utilized, the heading angular speed and the longitudinal speed of the vehicle are estimated according to the wheel speed difference of the rear wheels, and then the position and the heading variation of the wheel speed data of two adjacent times are derived according to the wheel speed model. Compared with the dead reckoning method in the related art, the method provided by the present application has the advantages that the speed, the position increment and the heading information estimated by the wheel speed can be used as an observation of the Kalman filtering model together, the speed, the position and the heading observation of the position and attitude estimation model are enriched, and meanwhile, the walk noise of the IMU three-axis gyroscope and acceleration is estimated. Accumulated errors caused by integration of the IMU three-axis gyroscope and three-axis acceleration information can be remarkably reduced in a long-distance dead reckoning process.

Figure 11:
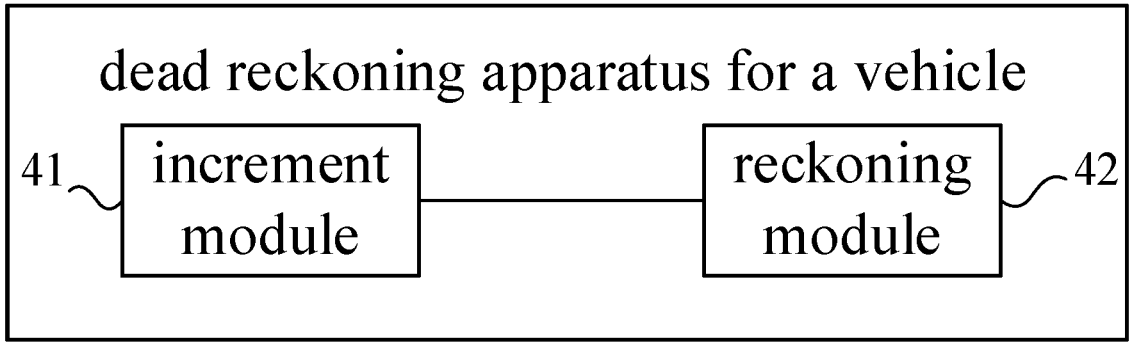
FIG. 11 is a block diagram of a dead reckoning apparatus for a vehicle according to an embodiment of the present application.

FIG. 11 is a block diagram of a dead reckoning apparatus for a vehicle according to an embodiment of the present application. The apparatus may include:

an increment module 41 configured for obtaining a position and attitude increment of the vehicle on the basis of wheel speed information of the vehicle; and a reckoning module 42 configured for performing dead reckoning on a position and attitude of the vehicle at a current moment, on the basis of the position and attitude increment of the vehicle and the position and attitude of the vehicle at a previous moment.

Figure 12:
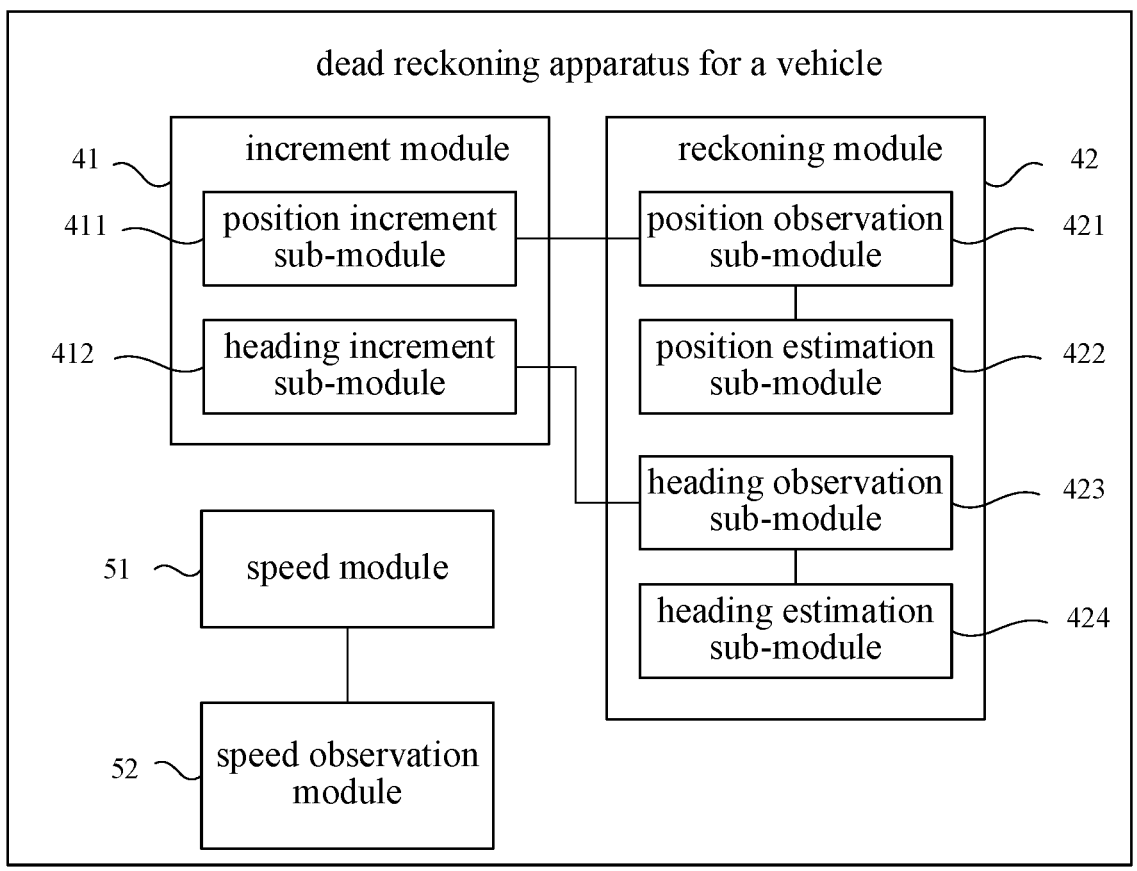
FIG. 12 is a block diagram of a dead reckoning apparatus for a vehicle according to an embodiment of the present application.

In one possible implementation, as shown in FIG. 12, the increment module 41 may include:

a position increment sub-module 411 configured for obtaining a position increment of the vehicle on the basis of the wheel speed information.

In one possible implementation, the position increment sub-module 411 may be specifically configured for calculating a motion arc length of a center of a rear axle on the basis of a left wheel speed, a right wheel speed, a wheel radius and a time length between adjacent moments; and calculating the position increment of the vehicle on the basis of the motion arc length of the center of the rear axle and a heading angle.

In one possible implementation, the reckoning module 42 may include:

a position observation sub-module 421 configured for obtaining a position observation of the vehicle at the current moment, on the basis of the position increment of the vehicle and a position of the vehicle at the previous moment.

In one possible implementation, the reckoning module 42 may further include:

a position estimation sub-module 422 configured for calculating a position difference value between the position observation of the vehicle at the current moment and a position apriority of the vehicle at the current moment, inputting the position difference value into a Kalman filtering model, and obtaining an optimal position estimation at the current moment.

In one possible implementation, the increment module 41 may further include:

a heading increment sub-module 412 configured for obtaining a heading increment of the vehicle on the basis of the wheel speed information.

In one possible implementation, the heading increment sub-module 412 may be specifically configured for calculating a heading angular speed of the vehicle on the basis of a difference value between a left wheel speed and a right wheel speed, a wheel track and a wheel radius; and calculating the heading increment of the vehicle on the basis of the heading angular speed of the vehicle and a time length between adjacent moments.

In one possible implementation, the reckoning module 42 may further include:

a heading observation sub-module 423 configured for obtaining a heading observation of the vehicle at the current moment, on the basis of the heading increment of the vehicle and a heading angle of the vehicle at the previous moment.

In one possible implementation, the reckoning module 42 may further include:

a heading estimation sub-module 424 configured for calculating a heading difference value between the heading observation of the vehicle at the current moment and a heading apriority of the vehicle at the current moment, inputting the heading difference value into a Kalman filtering model, and obtaining an optimal heading estimation at the current moment.

In one possible implementation, the apparatus may further include:

a speed module 51 configured for calculating a speed of the vehicle on the basis of the wheel speed information.

In one possible implementation, the speed module 51 may be specifically configured for calculating a left wheel linear speed and a right wheel linear speed on the basis of a left wheel speed, a right wheel speed and a wheel radius; and calculating a linear speed of a center of a rear axle on the basis of the left wheel linear speed and the right wheel linear speed.

In one possible implementation, the apparatus may further include:

a speed observation module 52 configured for obtaining a vehicle speed observation of the vehicle on the basis of a scale coefficient of a measured longitudinal speed of the rear axle to a real speed, a linear speed of a center of the rear axle, and a conversion matrix from a vehicle body coordinate system to a navigation coordinate system.

The functions of respective modules in each apparatus of the embodiment of the present application can refer to the corresponding descriptions in the above-mentioned methods, and will not be described repeatedly here.

In accordance with the embodiment of the present application, the present application also provides an electronic device and a readable storage medium.

Figure 13:
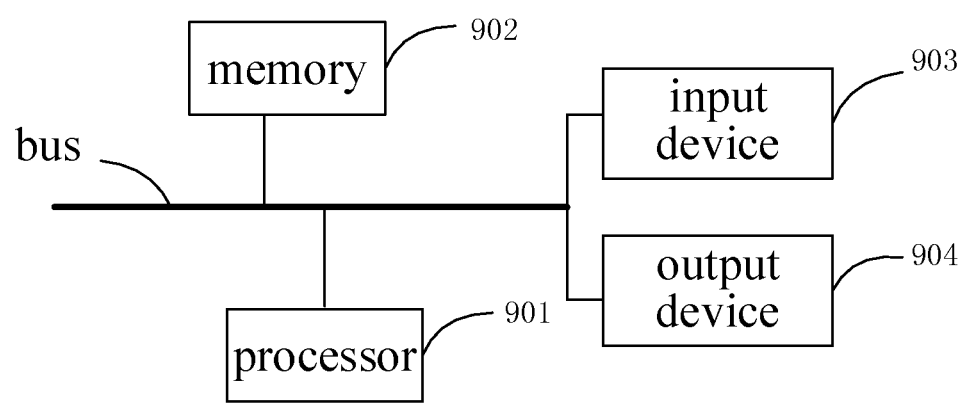
FIG. 13 is a block diagram of an electronic device for implementing a dead reckoning method for a vehicle according to an embodiment of the present application.

FIG. 13 is a block diagram of an electronic device for implementing the dead reckoning method for a vehicle according to an embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the application described and/or claimed herein.

As shown in FIG. 13, the electronic device may include one or more processors 901, a memory 902, and interfaces for connecting components, including high-speed interfaces and low-speed interfaces. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of a processor 901 is shown in FIG. 13.

The memory 902 is a non-transitory computer-readable storage medium provided by the present application. The memory stores instructions executable by at least one processor to cause the at least one processor to execute the dead reckoning method for a vehicle provided by the present application. The non-transitory computer-readable storage medium of the present application stores computer instructions for enabling a computer to execute the dead reckoning method for a vehicle provided by the present application.

The memory 902, as a non-transitory computer-readable storage medium, may be configured to store non-transitory software programs, non-transitory computer executable programs and modules, such as program instructions/modules corresponding to the dead reckoning method for a vehicle in the embodiment of the present application (e.g., the increment module 41 and the reckoning module 42 shown in FIG. 11). The processor 901 executes various functional applications and data processing of the server by running the non-transitory software programs, instructions and modules stored in the memory 902, that is, implements the dead reckoning method for a vehicle in the method embodiment described above.

The memory 902 may include a program storage area and a data storage area, wherein the program storage area may store an operating system, and an application program required for at least one function; and the data storage area may store data created according to the use of the electronic device for implementing the dead reckoning method for a vehicle. In addition, the memory 902 may include a high speed random access memory, and may also include a non-transitory memory, such as at least one disk storage device, a flash memory device, or other non-transitory solid state storage devices. In some embodiments, the memory 902 may optionally include memories remotely located with respect to the processor 901, and these remote memories may be connected, via a network, to the electronic device for implementing the dead reckoning method for a vehicle. Examples of such networks may include, but are not limited to, the Internet, an intranet, a local area network, a mobile communication network and combinations thereof.

The electronic device for implementing the dead reckoning method for a vehicle may further include an input device 903 and an output device 904. The processor 901, the memory 902, the input device 903, and the output device 904 may be connected by a bus or in other ways, and the bus connection is taken as an example in FIG. 13.

The input device 903 may receive input digital or character information, and generate a key signal input related to a user setting and a functional control of electronic device for implementing the dead reckoning method for a vehicle. For example, the input device may be a touch screen, a keypad, a mouse, a track pad, a touch pad, a pointer stick, one or more mouse buttons, a track ball, a joystick, and other input devices. The output device 904 may include a display apparatus, an auxiliary lighting device (e.g., a light emitting diode (LED)), a tactile feedback device (e.g., a vibrating motor), etc. The display apparatus may include, but is not limited to, a liquid crystal display (LCD), an LED display, and a plasma display. In some embodiments, the display apparatus may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other. The server may be a cloud server, also called as a cloud computing server or a cloud host, which is a host product in a cloud computing service system, to solve the defects of difficult management and weak business expansibility in the services of the traditional physical host and the virtual private server (VPS).

According to the technical solutions of the embodiments of the present application, the wheel speed information is utilized to obtain the position and attitude increment, and then the position and attitude increment is utilized for dead reckoning, so that the accumulated error can be reduced, and the precision of the dead reckoning result can be improved.

It should be understood that the steps can be reordered, added or deleted using the various flows illustrated above. For example, the steps described in the present application may be performed concurrently, sequentially or in a different order, so long as the desired results of the technical solutions disclosed in the present application can be achieved, and there is no limitation herein.

The above-described specific embodiments do not limit the scope of the present application. It will be apparent to those skilled in the art that various modifications, combinations, sub-combinations and substitutions are possible, depending on design requirements and other factors. Any modifications, equivalent substitutions, and improvements within the spirit and principles of this application are intended to be included within the scope of this application.

What is claimed is:

1. A dead reckoning method for a vehicle, comprising:
obtaining a position and attitude increment of the vehicle on the basis of wheel speed information of the vehicle, wherein the position and attitude increment comprises a position increment and an attitude increment; and
performing dead reckoning on a position and attitude of the vehicle at a current moment, by obtaining a position and attitude observation of the vehicle at the current moment on the basis of the position and attitude increment of the vehicle and the position and attitude of the vehicle at a previous moment, and obtaining a posteriori position and attitude estimation on the basis of the position and attitude observation at the current moment, a position and attitude apriority and a Kalman filtering model.

2. The method according to claim 1, wherein, the obtaining the position and attitude increment of the vehicle on the basis of the wheel speed information of the vehicle, comprises:
obtaining a position increment of the vehicle on the basis of the wheel speed information.

3. The method according to claim 2, wherein, the obtaining the position increment of the vehicle on the basis of the wheel speed information, comprises:
calculating a motion arc length of a center of a rear axle on the basis of a left wheel speed, a right wheel speed, a wheel radius and a time length between adjacent moments; and
calculating the position increment of the vehicle on the basis of the motion arc length of the center of the rear axle and a heading angle, and/or
wherein, the performing the dead reckoning on the position and attitude of the vehicle at the current moment, on the basis of the position and attitude increment of the vehicle and the position and attitude of the vehicle at the previous moment, comprises:
obtaining a position observation of the vehicle at the current moment, on the basis of the position increment of the vehicle and a position of the vehicle at the previous moment.

4. The method according to claim 2, wherein, the performing the dead reckoning on the position and attitude of the vehicle at the current moment, on the basis of the position and attitude increment of the vehicle and the position and attitude of the vehicle at the previous moment, comprises:
obtaining a position observation of the vehicle at the current moment, on the basis of the position increment of the vehicle and a position of the vehicle at the previous moment; and
calculating a position difference value between the position observation of the vehicle at the current moment and a position apriority of the vehicle at the current moment, inputting the position difference value into the Kalman filtering model, and obtaining an optimal position estimation at the current moment.

5. The method according to claim 1, wherein, the obtaining the position and attitude increment of the vehicle on the basis of the wheel speed information of the vehicle, comprises:

obtaining a heading increment of the vehicle on the basis of the wheel speed information.

6. The method according to claim 5, wherein, the obtaining the heading increment of the vehicle on the basis of the wheel speed information, comprises:
calculating a heading angular speed of the vehicle on the basis of a difference value between a left wheel speed and a right wheel speed, a wheel track and a wheel radius; and
calculating the heading increment of the vehicle on the basis of the heading angular speed of the vehicle and a time length between adjacent moments, and/or
wherein, the performing the dead reckoning on the position and attitude of the vehicle at the current moment, on the basis of the position and attitude increment of the vehicle and the position and attitude of the vehicle at the previous moment, comprises:
obtaining a heading observation of the vehicle at the current moment, on the basis of the heading increment of the vehicle and a heading angle of the vehicle at the previous moment.

7. The method according to claim 5, wherein, the performing the dead reckoning on the position and attitude of the vehicle at the current moment, on the basis of the position and attitude increment of the vehicle and the position and attitude of the vehicle at the previous moment, further comprises:
obtaining a heading observation of the vehicle at the current moment, on the basis of the heading increment of the vehicle and a heading angle of the vehicle at the previous moment, and
calculating a heading difference value between the heading observation of the vehicle at the current moment and a heading apriority of the vehicle at the current moment, inputting the heading difference value into the Kalman filtering model, and obtaining an optimal heading estimation at the current moment.

8. The method according to claim 1, further comprising:
calculating a speed of the vehicle on the basis of the wheel speed information.

9. The method according to claim 8, wherein, the calculating the speed of the vehicle on the basis of the wheel speed information, comprises:
calculating a left wheel linear speed and a right wheel linear speed on the basis of a left wheel speed, a right wheel speed and a wheel radius; and
calculating a linear speed of a center of a rear axle on the basis of the left wheel linear speed and the right wheel linear speed, and/or
further comprising:
obtaining a vehicle speed observation of the vehicle on the basis of a scale coefficient of a measured longitudinal speed of the rear axle to a real speed, a linear speed of a center of the rear axle, and a conversion matrix from a vehicle body coordinate system to a navigation coordinate system.

10. A dead reckoning apparatus for a vehicle, comprising:
a processor and a memory for storing one or more computer programs executable by the processor,
wherein when executing at least one of the computer programs, the processor is configured to perform operations comprising:
obtaining a position and attitude increment of the vehicle on the basis of wheel speed information of the vehicle, wherein the position and attitude increment comprises a position increment and an attitude increment; and performing dead reckoning on a position and attitude of the vehicle at a current moment, by obtaining a position and attitude observation of the vehicle at the current moment on the basis of the position and attitude increment of the vehicle and the position and attitude of the vehicle at a previous moment, and obtaining a posteriori position and attitude estimation on the basis of the position and attitude observation at the current moment, a position and attitude apriority and a Kalman filtering model.

11. The apparatus according to claim 10, wherein, when executing at least one of the computer programs, the processor is configured to further perform operations comprising:

obtaining a position increment of the vehicle on the basis of the wheel speed information.

12. The apparatus according to claim 11, wherein, when executing at least one of the computer programs, the processor is configured to further perform operations comprising:

calculating a motion arc length of a center of a rear axle on the basis of a left wheel speed, a right wheel speed, a wheel radius and a time length between adjacent moments; and calculating the position increment of the vehicle on the basis of the motion arc length of the center of the rear axle and a heading angle, and/or obtaining a position observation of the vehicle at the current moment, on the basis of the position increment of the vehicle and a position of the vehicle at the previous moment.

13. The apparatus according to claim 11, wherein, when executing at least one of the computer programs, the processor is configured to further perform operations comprising:

obtaining a position observation of the vehicle at the current moment, on the basis of the position increment of the vehicle and a position of the vehicle at the previous moment, and calculating a position difference value between the position observation of the vehicle at the current moment and a position apriority of the vehicle at the current moment, inputting the position difference value into the Kalman filtering model, and obtaining an optimal position estimation at the current moment.

14. The apparatus according to claim 10, wherein, when executing at least one of the computer programs, the processor is configured to further perform operations comprising:

obtaining a heading increment of the vehicle on the basis of the wheel speed information.

15. The apparatus according to claim 14, wherein, when executing at least one of the computer programs, the processor is configured to further perform operations comprising:

calculating a heading angular speed of the vehicle on the basis of a difference value between a left wheel speed and a right wheel speed, a wheel track and a wheel radius; and calculating the heading increment of the vehicle on the basis of the heading angular speed of the vehicle and a time length between adjacent moments, and/or obtaining a heading observation of the vehicle at the current moment, on the basis of the heading increment of the vehicle and a heading angle of the vehicle at the previous moment.

16. The apparatus according to claim 14, wherein, when executing at least one of the computer programs, the processor is configured to further perform operations comprising:

obtaining a heading observation of the vehicle at the current moment, on the basis of the heading increment of the vehicle and a heading angle of the vehicle at the previous moment, and calculating a heading difference value between the heading observation of the vehicle at the current moment and a heading apriority of the vehicle at the current moment, inputting the heading difference value into the Kalman filtering model, and obtaining an optimal heading estimation at the current moment.

17. The apparatus according to claim 10, wherein, when executing at least one of the computer programs, the processor is configured to further perform operations comprising:

calculating a speed of the vehicle on the basis of the wheel speed information.

18. The apparatus according to claim 17, wherein, when executing at least one of the computer programs, the processor is configured to further perform operations comprising:

calculating a left wheel linear speed and a right wheel linear speed on the basis of a left wheel speed, a right wheel speed and a wheel radius; and calculating a linear speed of a center of a rear axle on the basis of the left wheel linear speed and the right wheel linear speed, and/or obtaining a vehicle speed observation of the vehicle on the basis of a scale coefficient of a measured longitudinal speed of the rear axle to a real speed, a linear speed of a center of the rear axle, and a conversion matrix from a vehicle body coordinate system to a navigation coordinate system.

19. A non-transitory computer-readable storage medium storing computer instructions, wherein the computer instructions cause a computer to perform the method according to claim 1.

20. A non-transitory computer-readable storage medium storing computer instructions, wherein the computer instructions cause a computer to perform the method according to claim 2.

* * * * *